United States Patent [19]

Hicks

[11] 4,090,416
[45] May 23, 1978

[54] GEAR BOXES
[75] Inventor: Raymond John Hicks, Llanwrthwl, Wales
[73] Assignee: Vickers Limited, London, England
[21] Appl. No.: 608,220
[22] Filed: Aug. 27, 1975
[30] Foreign Application Priority Data
  Sep. 4, 1974   United Kingdom .............. 38739/74
[51] Int. Cl.² .......................... F16H 3/44; F16H 1/28
[52] U.S. Cl. ..................................... 74/785; 74/801
[58] Field of Search ............ 308/72; 64/9 R; 74/785, 74/801, 410

[56] References Cited
U.S. PATENT DOCUMENTS

| | | | |
|---|---|---|---|
| 2,951,396 | 9/1960 | Kooistra | 64/9 R |
| 3,036,475 | 5/1962 | Haupt | 74/410 |
| 3,303,713 | 2/1967 | Hicks | 74/801 |
| 3,434,374 | 3/1969 | Barwig et al. | 74/410 |
| 3,587,338 | 6/1971 | Heariot | 74/410 |
| 3,626,719 | 12/1971 | Church | 64/9 R |

Primary Examiner—Samuel Scott
Assistant Examiner—Wesley S. Ratliff, Jr.
Attorney, Agent, or Firm—Whittemore, Hulbert & Belknap

[57] ABSTRACT

A gear box serving as a transmission coupling between nominally co-axial driving and driven shafts with a gear train within a casing of the gear box coupled to these shafts by flexible couplings that are disposed within the casing about the centers of bearings on which the casing is mounted.

13 Claims, 4 Drawing Figures

GEAR BOXES

This invention relates to a gearbox serving as a transmission coupling between nominally co-axial driving and driven shafts, and is primarily concerned with such transmission couplings which include epicyclic gearing operating in solar, or star or planetary configurations, in compound or multiple assembly to provide the required speed and torque characteristics to match a driven component such as a pump, with a power source such as an electric motor, in an arrangement where all the components of the assembly are mounted upon a common bed plate. An advantageous form of epicyclic gearbox employs flexible spindles to support the planet pinions, and since such gearboxes have high power transmission capacities, they may be made much smaller and lighter than conventional gearboxes for the same duty. Thus it is common practice to find such a gearbox mounted between driving and driven components which are physically much larger, heavier and have considerably greater rotational inertia than that of the gearbox. Consequently, it is usually necessary to mount the gearbox on a pedestal some distance above the bed plate, and incorporate heavy flexible couplings into the assembly to isolate each component at the rotary interfaces of each individual component, and by this means attempt to compensate for errors of alignment between the axes of rotation of the three main components. Mounting the gearbox above the bed plate requires extra steelwork and may introduce rigidity and vibrational problems while the heavy flexible couplings impose high loads on the supporting bearings — particularly those in the gearbox. Furthermore there are the disadvantages that considerable axial length is required to accommodate the flexible couplings, and additional degrees of torsional and axial freedom are introduced by the provision of the couplings. In the event of one or other of the driving or driven components exhibiting severe cyclic variations in torque or speed, the additional flexibility offered by the couplings tends to add to the degrees of vibrator freedon and hence complicates the dynamic and vibratory characteristics of the system. Furthermore, it frequently occurs that with a configuration such as described, the rotating axis of each component thus mounted, including those of the two resilient couplings, can be mutually misaligned with their neighbors to introduce a possible total of five potentially different axes of rotation over the length of the entire assembly.

According to the present invention there is provided a gearbox serving as a transmission coupling between nominally co-axial driving and driven shafts, a gear train within a casing of the gearbox being coupled to said driving and driven shafts by flexible couplings that are disposed within the casing about the centers of bearings on which the casing is mounted. The gearbox can be of any form, particularly but not exclusively, one including epicyclic gearing as discussed above. In use of a gearbox so mounted mal-alignment occurring between the driving and driven components is catered for by the inbuilt ability of the gearbox to adopt an attitude of alignment between these components such that the total number of rotating axes is reduced from the five referred to above to a maximum of three, thus considerably reducing the extent of vibratory freedom.

For a better understanding of the invention and to show how the same may be carried into effect, reference will now be made, by way of example, to the accompanying drawings.

Figure 1:
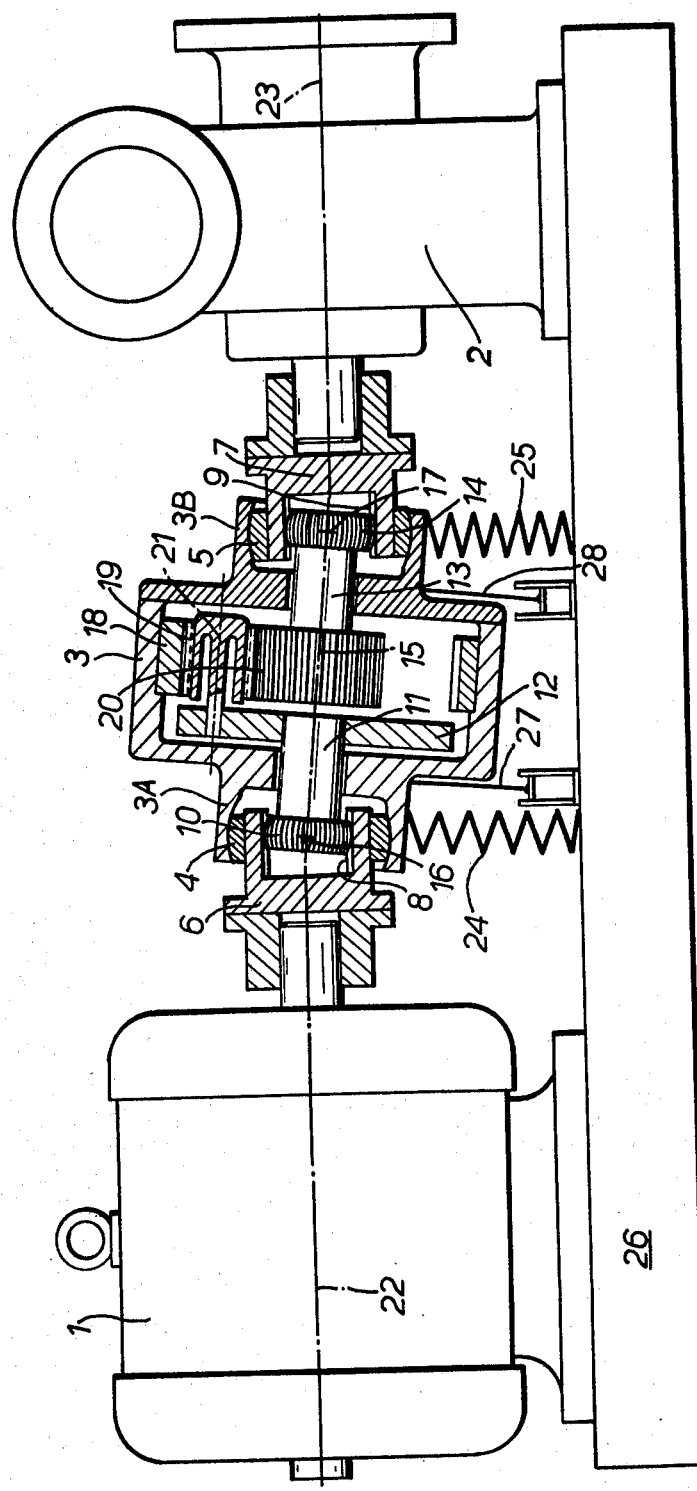
FIG. 1 is a partly sectional sideview digrammatically illustrating one form of an epicyclic geared coupling constructed according to the invention and disposed between nominally co-axial driving and driven shafts shown in the Figures in mal-alignment.

Referring first to FIG. 1, this Figure shows the basic planetary configuration of an epicyclic self-aligning transmission coupling mounted between an electric motor 1 and a driven pump 2. The concept to be described could equally apply to solar or star, compound or multiple configurations of the epicyclic gear.

A gear casing 3 of the planetary epicyclic transmission coupling is located and supported at input and output shaft portions 3A and 3B by bearings 4, 5 respectively which are in turn carried upon two hollow shafts 6, 7. The first hollow shaft 6 is fixed to the output shaft of the motor 1 and the second hollow shaft 7 is fixed to the input shaft of the pump 2, the shafts of the motor and pump, and hence the shafts 6 and 7, being nominally co-axial. The hollow shafts 6, 7 are provided with internal gear teeth 8, 9. Meshing with the internal gear teeth 8 at the motor end is a crowned tooth gear 10 which is attached to a stub shaft 11 to transmit rotary motion to a planet carrier member 12. In a similar manner a transmission coupling sun gear output stub shaft 13 is likewise attached to a crowned tooth gear 14 that is meshed with the internal gear teeth 9 within the hollow shaft 7 which is connected to the driven pump 2.

There is thus provided within the casing 3 flexible couplings about the centers of the bearings 4, 5 and that are in the form of crowned tooth gears 10 and 14 meshing with straight cut teeth 8 and 9 respectively. Such gears will permit up to about half a degree of angular misalignment between their input and output axes as well as allowing axial movement. The gearbox bearings 4 and 5 may be journal bearings, though other types are possible. Journal bearings operate with clearances of about one thousandth of an inch per inch of shaft diameter and can thus accept misalignments of the same order of magnitude as crown tooth gears. Journal bearings also permit axial movement. Thus both flexible couplings and bearings are mutually compatible and arranged to pivot about common centers 16 and 17.

When the system is assembled, and there is misalignment between the driving and driven shafts, the gearbox casing adopts the attitude shown in the Figures lying between the ends of the driving and the driven shafts with any angular misalignments divided roughly between the two bearings. At both driven and driving ends of the gearbox, the crown tooth gear adopts the same angular displacement as its respective bearing, so maintaining the alignment integrity of the gearbox. When the assembly is operating, the driving conditions of speed and torque cause a slight modification of the gearbox attitude and the crown tooth gears accordingly accept the same changes in alignment. Thus, for any driving condition, the gearbox, through the bearing clearances and the crown tooth gears adopts the optimum attitude for power transmission, that is a mean attitude for all conditions of speed of rotation and torque, as indicated by the gearbox axis 15 which passes through the centers 16, 17 of the bearings 4, 5 lying on the axis of rotation of the motor 1 and of the pump 2 respectively. The axis 15 between the bearing centers 16, 17 determines the attitude of the gearbox and hence the axis of the annulus gear 18 which is fast with the gear casing 3. Because the plurality of the planet pinions 19 which is provided meshes directly with both the annulus gear 18 and the sun gear 20, all the gears of the epicyclic train which is coupled by the flexible couplings 8/10, 9/14 to the shafts 6 and 7 adopt the attitude defined by the gearbox axis 15, as shown in FIG. 1. To facilitate this the planet pinions 19 are supported from the planet carrier member 12 by flexible cantilever spindles 21, such as described in British Pat. No. 1,101,131, so that, superimposed on their normal planetary motion, these spindles may flex to encompass any minor excursions. Such excursions may be caused by errors in machining the gear teeth or errors in siting the spindles in the planet carrier member 12, or may be due to the additional mobility of the planet pinions and the sun gear permitted in this design of epicyclic self-aligning transmission coupling.

The crowned tooth gear 10 accepts the rotational drive from its mating teeth 8, rotating about the motor axis 22, and transmits the rotational drive into the gearbox about the axis 15. In the same way, the rotational drive from the sun gear 20 is taken by the crowned tooth gear 14, rotating about the gearbox axis 15 and transmitted to its mating teeth 9, rotating about pump axis 23. Thus the rotary motion is transmitted from the power source to the planet carrier member 12 and thence to the plurality of planet pinions 19 via their flexible cantilever spindles 21, from where it may take one of two potential power output paths. These paths may be either to the sun gear, using the annulus gear as the fixed reaction member, or to the annulus gear when the sun gear becomes the reaction member.

In the case where the annulus gear becomes the fixed reaction member, as shown in FIG. 1, the gear casing 3 is restrained from rotating by resilient anchorages 24, 25 extending from an assembly bed plate 26 in such a way as to locate the gearbox, yet provide flexibility to permit the full range of gearbox mobility for power transmission between misaligned shafts. Dampers 27, 28 are incorporated into the anchorages 24, 25 to inhibit any torsional vibratory excursions to which the gear case may be subject.

Each of the crowned tooth gears 10, 14 is, as shown, disposed geometrically at the centers 16, 17 of each casing support bearing 4, 5, and in this manner the gear casing 3 is permitted limited multidirectional excursion from the nominal axial alignment, so facilitating a means by which the power source may be coupled directly to the driven pump, via the geared transmission coupling, thus eliminating the necessity of two individual resilient couplings at the rotary interfaces of the motor, gearbox and pump.

The extent of permissible axial and angular malalignment is determined by the confines of the bearings 4, 5 upon which the gear casing 3 is supported, and the limitations imposed by the meshing of the crowned tooth gears 10, 14.

Under operating conditions, torque is applied through the epicyclic transmission coupling to the pump. In so doing, the transmission coupling adopts an attitude such as to align itself between the shafts of the driving motor and the driven pump, and also provides the appropriate gear ratio for matching these components.

Figure 2:
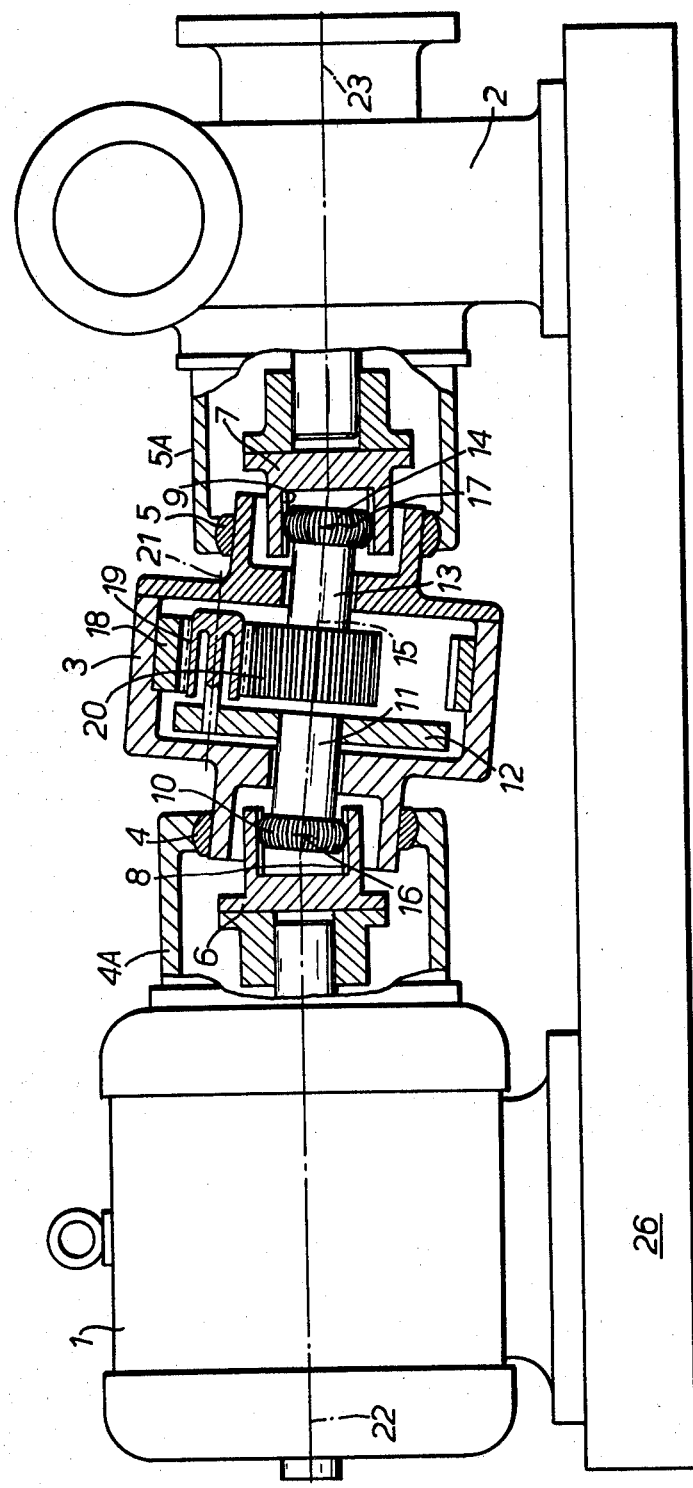
FIG. 2 is similar to FIG. 1 and illustrates an embodiment of the epicyclic geared coupling without resilient anchorage.

In certain applications, e.g., very high speeds, it may be desirable to mount the bearing(s) 4 and/or 5 each in a stationary housing mounted on the (respective) casing of the driving and/or driven components such as shown in FIG. 2 for both bearings 4 and 5, the stationary housings being referenced 4A and 5A. As shown in FIG. 2, it is essential that the housings 4A and 5A be concentric with their respective shaft ends and that the associated bearing centers should lie in the same transverse plane as the common centers 16 and 17. It should also be noted that whilst the foregoing description makes specific reference to tooth type couplings, it should be understood that any other type of coupling having angular and axial flexibility may be used, e.g., a diaphragm type. Insofar as there would be nominally zero speed on the bearings 4 and/or 5, the housing 4A and 5A would, in effect, be coupling guards.

Figure 3:
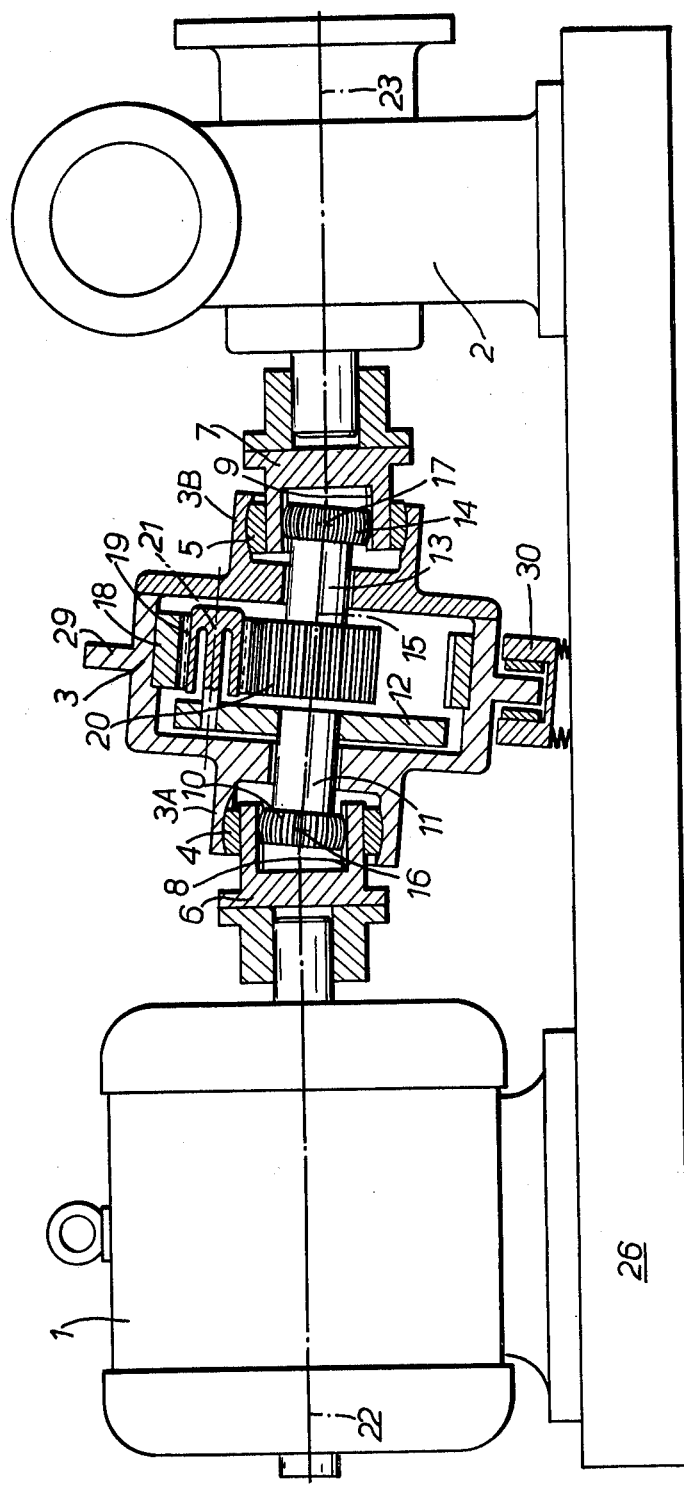
FIG. 3 is similar to FIG. 1 and illustrates an embodiment of the epicyclic geared coupling with a brake mechanism.

FIG. 3 shows a variation wherein the gear casing 3 is supported on bearings 4, 5 in a similar manner to that described above with reference to FIG. 1, but wherein the resilient anchorages between the gear casing and bed plate are omitted, thus enabling the gear casing to rotate freely about its own axis 15. In this form an annular braking surface 29 is provided on the exterior of the gear casing, positioned concentrically about the gear casing axis 15 and co-operating with a brake mechanism 30 resiliently mounted on the bed plate 26. The brake mechanism 30 can be operated to control the speed of rotation of the assembly, giving a clutch effect. With the drive motor 1 running, operation of the assembly is effected by engagement of the friction surfaces of this brake/clutch mechanism, whereby rotary motion of the gear casing can be arrested in order to initiate the output drive of the epicyclic gearing to the sun gear, and thence to the pump, the casing 3 being resiliently supported, in this condition, from the bed plate 26 through the brake/clutch mechanism.

Conversely, in order to stop the rotation of the pump, it is only necessary to release the friction surfaces of the brake/clutch mechanism, and thus allow the gear casing to rotate freely about its own axis 15, whereupon the sun gear drive to the pump ceases to rotate.

Figure 4:
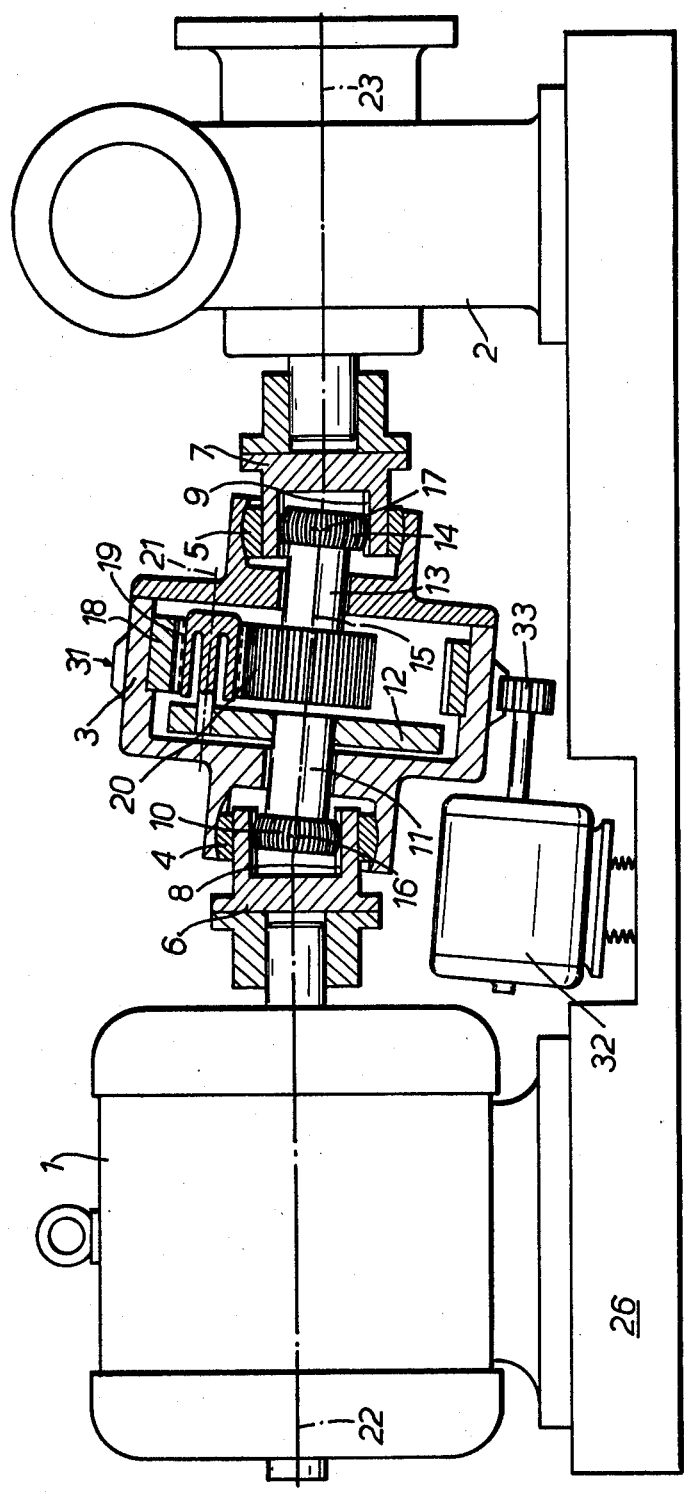
FIG. 4 is similar to FIG. 1 and illustrates an embodiment of the epicyclic geared coupling with an additional power source.

In FIG. 4 there is shown an alternative configuration that enables a wider range of speed control than in the forms described with reference to FIGS. 1 to 3, and which facilitates the feature of infinitely variable speed control over the driven pump.

As shown in FIG. 4 the features of the brake/clutch mechanism and annular friction area are omitted, and replaced by an exterior annular gear 31 which surrounds the casing 3, is rigidly attached thereto, and is concentric with the casing axis 15. As described above with reference to FIGS. 1 and 3 however, the casing 3 is supported upon bearings 4, 5 between the motor and the pump.

By providing an additional power source which may be operated in either direction of rotation, e.g., a reversible variable speed electric motor 32 resiliently mounted on the bed plate 26, a drive pinion 33 of which is engaged with the external annular gear 31 which surrounds the gear casing, an alternative medium of control to the conditions applied to the gear casing is provided. By controlling the gear casing from a static state to either direction of rotation, the output speed to the sun gear and hence to the driven pump can be controlled over a considerabel greater range than is possible with the forms of FIGS. 1 to 3, in that, within the speed limitations of the driving motor, the medium of control enables a drive having infinitely variable ratio change to the driven pump.

In operation of the form of FIG. 4, with the main drive motor running and the gear casing 3 allowed to rotate, and with the meshing pinion 33 of the secondary drive motor 32 likewise running freely, there is no drive to the sun gear and pump. On application of a retarding force to the external annular gear 31 by energizing and slowing the secondary drive motor 32, drive to the sun gear and pump is initiated. By bringing the secondary drive motor 32 completely to a stop, comparably to the application of the brake in the form of FIG. 3, the drive to the pump becomes constant and proportional in speed to that of the main drive motor. By reversing the direction of the secondary drive motor, the speed of the sun gear, and hence of the pump is increased. By increasing the speed of the secondary drive motor there is proportional increase in the speed of the sun gear and hence of the attached pump. Thus in this form speed control to the pump is obtained that is entirely stepless, and variable from the condition at which the pump is stationary, to any desired speed within the limitations of the drive motors. The casing is resiliently supported from the bed plate through the secondary drive motor.

In all forms described individual resilient couplings at the rotary interfaces of each component are eliminated, minimizing the degrees of vibratory freedom, and facilitating smooth operation and constructional compactness.

Each coupling described is capable of the transmission of rotary motion in either direction between two nominally co-axial shafts, the axes of which may become laterally or angularly misaligned, and incorporates a gear ratio change and two flexible couplings into a minimum axial length. In the forms of FIGS. 1, 3, and 4 the casing 3 is mounted resiliently upon the bed plate 26 between driving and driven members (the motor 1 and the pump 2) that are rigidly mounted on the bed plate 1, so that the coupling is free to adopt the optimum attitude for power transmissions between the driving and driven shafts, and in a manner such that the resilient mounting attenuates noise transmission directly from the gear casing to the bed plate. The dynamic elastic system of the coupling may be tuned to avoid torsional vibratory excursions, when the gear ratio is varied, by selecting the stiffness of the flexible cantilever spindles which carry the planet pinions; or by selecting the stiffness of the gear casing anchorages to the bed plate; or by inhibiting the torsional vibratory excursions utilising dampers incoporated into the resilient anchorages to the bed plate (FIG. 1).

I claim:

1. A gear box serving as a transmission coupling between nominally co-axial driving and driven shafts, the gear box comprising a casing, bearings mounting the casing with respect to said shafts, an epicyclic gear train within the casing, and flexible couplings that are disposed within the casing about the centers of said bearings and that couple said gear train to said driving and driven shafts, each flexible coupling comprising a crowned tooth gear meshed with an internally toothed gear having straight cut teeth, the annulus gear of the epicyclic gear train and said casing being fast with one another and able to rotate; and a prime mover being provided that is coupled to said casing for rotating said casing and said annulus gear at a desired speed and direction; or for preventing such rotation.

2. A gear box according to claim 1 and comprising flexible cantilever spindles supporting the planet pinions of the epicyclic gear train from the planet carrier member of the gear train.

3. A gear box according to claim 1, wherein said bearings on which said casing is mounted are mounted for pivoting about pivot centers each of which is common with a pivot center of the associated one of said flexible couplings.

4. A gear box according to claim 1, and further including braking means being provided for controlling the speed of rotation of the casing and annulus gear in said use.

5. A gear box according to claim 4, wherein said brake means is resiliently mounted in said use.

6. A gear box according to claim 1, wherein said prime mover is resiliently mounted in said use.

7. A gear box according to claim 1 wherein a pinion fast with said casing is coupled to be driven by said prime mover, and wherein said prime mover is a reversible variable speed electric motor.

8. A gear box according to claim 1 and comprising housings in which are mounted said bearings on which said casing is mounted, said housings being stationary relative to components serving for driving or to be driven by said driving shaft or said driven shaft and each such housing being concentric with that one of said driving and driven shafts that is associated therewith, the center of each said bearing lying in a plane that is common to the pivot centers of said flexible couplings.

9. A gear box according to claim 1, wherein said bearings on which the casing is mounted are journal bearings.

10. A transmission coupling between nominally co-axial driving and driven shafts, comprising a first hollow shaft, one end of which is sleeved over the driving shaft and is fixed against rotation relative thereto, and the other end of which includes internal straight cut gear teeth therein, a second hollow shaft, one end of which is sleeved over the driven shaft and is secured thereto for rotation therewith, straight cut internal gear teeth in the other end of the second hollow shaft, a casing positioned between the other ends of the hollow shafts, a separate self-centering bearing between the casing and the other ends of each of the hollow shafts, a sun gear shaft secured for rotation in the casing including a sun gear on one end thereof and a crowned tooth gear on the other end thereof meshed with the straight cut internal gear teeth in the other end of the second hollow shaft and concentric with and having the same center as one of said bearings, an annulus gear fixed internally to the casing and concentric with the sun gear, a planet gear shaft rotatably mounted in the casing, a planet carrier member secured to one end of the planet gear shaft within the casing and planet gears secured to the planet carrier member positioned between and in mesh with the sun gear and annulus gear, a crowned tooth gear on the other end of the planet gear shaft meshed with the straight cut internal gear teeth in the other end of the first hollow shaft and concentric with and having the same center as one of said bearings whereby a flexible drive means between the nominally co-axial driving and driven shafts is effected and an annular external gear on the casing concentric with the planet and annulus gear, a pinion in mesh with the external gear, and motor means for rotating the pinion to provide controlled rotation of the casing.

11. Structure as set forth in claim 10 and further including resilient means supporting the casing against rotation at the self-aligning bearings.

12. Structure as set forth in claim 10 and further including damping structure secured to the casing adjacent the self-aligning bearings for damping transverse movement thereof.

13. Structure as set forth in claim 10 and further including brake means secured to the casing for controlling rotation of the casing.

* * * * *